United States Patent
He et al.

(10) Patent No.: US 8,510,149 B1
(45) Date of Patent: Aug. 13, 2013

(54) METHOD OF CONSTRUCTING CAUSALITY NETWORK GRAPHS AND VISUAL INFERENCE PRESENTATIONS FOR BUSINESS RULE APPLICATIONS

(75) Inventors: Qingfeng He, Durham, NC (US); Khosrow Moslehi, Palo Alto, CA (US); Xiaoming Feng, Cary, NC (US); Peng Peng, San Jose, CA (US)

(73) Assignee: ABB Research Ltd., Zurich (CH)

( * ) Notice: Subject to any disclaimer, the term of this patent is extended or adjusted under 35 U.S.C. 154(b) by 374 days.

(21) Appl. No.: 12/472,440

(22) Filed: May 27, 2009

Related U.S. Application Data

(60) Provisional application No. 61/056,093, filed on May 27, 2008.

(51) Int. Cl.
*G06Q 10/00* (2012.01)
(52) U.S. Cl.
USPC ........................................................ 705/7.26
(58) Field of Classification Search
USPC ........................................................ 705/7.26
See application file for complete search history.

(56) References Cited

U.S. PATENT DOCUMENTS

| | | | |
|---|---|---|---|
| 4,916,625 A * | 4/1990 | Davidson et al. ............. 700/139 |
| 5,195,172 A * | 3/1993 | Elad et al. ....................... 706/62 |
| 5,528,516 A * | 6/1996 | Yemini et al. .................. 702/181 |
| 5,661,668 A * | 8/1997 | Yemini et al. .................. 702/186 |
| 5,809,212 A * | 9/1998 | Shasha ............................. 706/46 |
| 6,249,755 B1 * | 6/2001 | Yemini et al. .................. 702/183 |
| 6,868,367 B2 * | 3/2005 | Yemini et al. .................. 702/183 |
| 7,003,433 B2 * | 2/2006 | Yemini et al. .................. 702/183 |
| 7,107,185 B1 * | 9/2006 | Yemini et al. .................. 702/183 |
| 7,209,846 B2 * | 4/2007 | Tamaki et al. .................. 702/84 |
| 7,254,646 B2 * | 8/2007 | Aguilera et al. ............. 709/249 |
| 7,337,090 B1 * | 2/2008 | Yemini et al. .................. 702/183 |
| 2005/0015424 A1 * | 1/2005 | Aguilera et al. ............. 709/200 |
| 2008/0147584 A1 * | 6/2008 | Buss ................................ 706/47 |
| 2009/0119584 A1 * | 5/2009 | Herbst ............................ 715/273 |

OTHER PUBLICATIONS

Raich, Margit. Basic Values and Objectives Regarding Money. Implications for the management of customer relationships. International Journal of Bank Marketing. vol. 26, No. 1, 2008. pp. 25-41.*
Sanguesa, Ramon and Cortes, Ulises. Learning causal networks from data: a survey and a new algorithm for recovering possibilistic causal networks. AI Communications 10 (1997) 31-61.*
Joseph C. Giarratano and Gary D. Riley, Expert Systems Principles and Programming, 2005, pp. 1-38, 157, 158, 167-173, 832, Fourth Edition, Course Technology, Thomson Learning, Inc., Boston.

* cited by examiner

*Primary Examiner* — Johnna Loftis
(74) *Attorney, Agent, or Firm* — Michael C. Prewitt; Steven W. Hudnut

(57) ABSTRACT

A method is described for collecting inference execution events from forward-chaining business rule engines and constructing causality network graphs for visual presentation to an end user. Using the causality network graph, the user may navigate logic paths leading to particular conclusions or actions.

20 Claims, 12 Drawing Sheets

| | |
|---|---|
| R1 | if(t=1) then (Generator(i).Capacity(i) = Generator(i).InitialCapacity) |
| R2 | if(t=1) then (Generator(i).RampRate(t) = Generator(i).InitialRampRate) |
| R3 | if(t>1) then(Generator(i).Ramprate(t) = Min(Generator(i).RampRate(t-1) + 1.0, Generator(i).MaxRampRate) |
| R4 | if(t>1) Then (Generator(i).Capacity(t) = Min(Generator(i).Capacity(t-1) + Generator(i).RampRate(t), Generator(i).MaxCapacity)) |
| R5 | Generator(i).Energy(t) + Generator(i).Reserve(t) <= Generator(i).Capacity(t) |
| R6 | EnergySupplied(t) = Demand.Energy(t) |
| R7 | ReservedSupplied(t) >= Demand.Reserve(t) |

Fig 14

| Generator | InitialCapacity | InitialRampRate | MaxRampRate | MaxCapacity |
|---|---|---|---|---|
| XYZ | 50 | 2 | 10 | 100 |
| UVW | 50 | 2 | 10 | 100 |

Fig 15

| Time | Generator | Energy | Reserve |
|---|---|---|---|
| 1 | XYZ | 60 | 10 |
| 2 | XYZ | 60 | 10 |
| 3 | XYZ | 60 | 10 |
| 4 | XYZ | 60 | 10 |
| 5 | XYZ | 60 | 10 |
| 6 | XYZ | 60 | 10 |
| 1 | UVW | 40 | 20 |
| 2 | UVW | 40 | 20 |
| 3 | UVW | 40 | 20 |
| 4 | UVW | 40 | 20 |
| 5 | UVW | 40 | 20 |
| 6 | UVW | 40 | 20 |

Fig 16

| Time | Demand.Energy | Demand.Reserve |
|---|---|---|
| 1 | 100 | 40 |
| 2 | 110 | 30 |
| 3 | 100 | 40 |
| 4 | 110 | 30 |
| 5 | 100 | 40 |
| 6 | 110 | 30 |

Fig 17

METHOD OF CONSTRUCTING CAUSALITY NETWORK GRAPHS AND VISUAL INFERENCE PRESENTATIONS FOR BUSINESS RULE APPLICATIONS

CROSS REFERENCE TO RELATED APPLICATION

This application claims the benefit of U.S. provisional patent application No. 61/056,093 filed on May 27, 2008 and entitled Method of Constructing Causality Network Graphs and Visual Inference Presentations for Business Rule Applications, which is hereby incorporated by reference in its entirety.

TECHNICAL FIELD

The present invention relates to software programs for constructing causality networks graphs and building visual inference presentations for business rule applications.

BACKGROUND OF THE INVENTION

For complex logic processing, commercial business rule engines provide many advantages over traditional procedural based programming languages. These advantages include externalization of business logic and rule transparency. However, for complex logic processing, the end-user often must determine how the final conclusions are made in order to be confident of the results. Most commercial business rule engines only support forward-chaining (FC) reasoning, which does not provide explanation capabilities that are naturally supported by backward-chaining rule engines. Explanation capability is an important capability for rule-based expert systems and helps users understand why a conclusion is made. A typical use case is when a system carries a conversation with an end user and the user can ask "Why" and "How" questions at any stage. "Why" displays the rules under consideration and "how" searches the history tree and displays the rules and data leading to the current solution. The lack of easy-to-use explanation capability often hinders the acceptance of the rule based solutions.

Forward-chaining rule engines begin with existing facts and identify all rules with conditions that are satisfied. The engine then executes the consequence or action part of the rules which results in the modification, deletion, or creation of new facts. This in turn could cause more rules to be satisfied, and consequently trigger their execution. This process continues until no more rules are satisfied and the decision or result is reached. Often, when multiple rules are involved in multi-step reasoning, the chain of cause and effect relationships is not obvious from the conclusion alone.

Inference back-track capability is not provided in mainstream business rule engine products because of the difficulty of performing such a function with forward-chaining rule engines. This is due to the fact that forward chaining rule engines are data driven, which means forward chaining starts with the available data and uses inference rules to generate more data until an optimal goal is reached. An inference engine using forward chaining searches the rules until it finds one where the antecedent (If clause) is known to be true. When found, it concludes the consequent (Then clause), resulting in the addition of new information to its data. In contrast, backward chaining starts with a list of goals (or a hypothesis) and works backwards from the consequent to the antecedent to see if there is data available that will support any of these consequents. An inference engine using backward chaining would search the rules until it finds one which has a consequent (Then clause) that matches a desired goal. If the antecedent (If clause) of that rule is not known to be true when evaluated against available data, then it is added to the list of goals. This process is often called goal seeking. As a result, backward chaining rule engines provide a natural way to explain why and how a conclusion is made, whereas it is not easy to do so in forward chaining rule engines.

Thus, there is a need in the art for a method of analyzing business rule engines and providing visual presentations showing facts, rules and reasoning paths leading to a conclusion.

SUMMARY OF THE INVENTION

In accordance with one aspect of the present invention, a method is provided for analyzing the conclusions of a business rule engine wherein execution of the business rule engine includes rule execution events and object modification events. The method includes capturing the rule execution events and the object modification events. A unique global sequence identifier is assigned to each rule execution event and object modification event. An if collection and a then collection is built for each captured rule execution event. Attribute information is collected for each captured object modification event. A rule backward link is created from each rule execution event, to each object modification event in the if collection of the rule execution event. An object backward link is created from each object modification event to the rule execution event that created the object modification event. The rule execution events, object modification events, rule backward links and object backward links are then visually displayed.

In accordance with another aspect of the present invention, a computer readable medium is provided containing computer executable instructions which, when executed by a computer, perform a method for analyzing the conclusions of a business rule engine wherein execution of the business rule engine includes rule execution events and object modification events. The method includes capturing the rule execution events and the object modification events. A unique global sequence identifier is assigned to each rule execution event and object modification event. An if collection and a then collection is built for each captured rule execution event. Attribute information is collected for each captured object modification event. A rule backward link is created from each rule execution event, to each object modification event in the if collection of the rule execution event. An object backward link is created from each object modification event to the rule execution event that created the object modification event. The rule execution events, object modification events, rule backward links and object backward links are then visually displayed.

BRIEF DESCRIPTION OF THE DRAWINGS

The features, aspects, and advantages of the present invention will become better understood with regard to the following description, appended claims, and accompanying drawings where:

FIG. 14 is a chart showing a plurality of rules for a second exemplary causality network graph including interim data manipulation rules and dispatch availability rules.

FIG. 15 is a chart showing a first sample data set for the second exemplary causality network graph.

FIG. 16 is a chart showing a second sample data set for the second exemplary causality network graph.

FIG. 17 is a chart showing a third sample data set for the second exemplary causality network graph.

DETAILED DESCRIPTION OF ILLUSTRATIVE EMBODIMENTS

Figure 1:
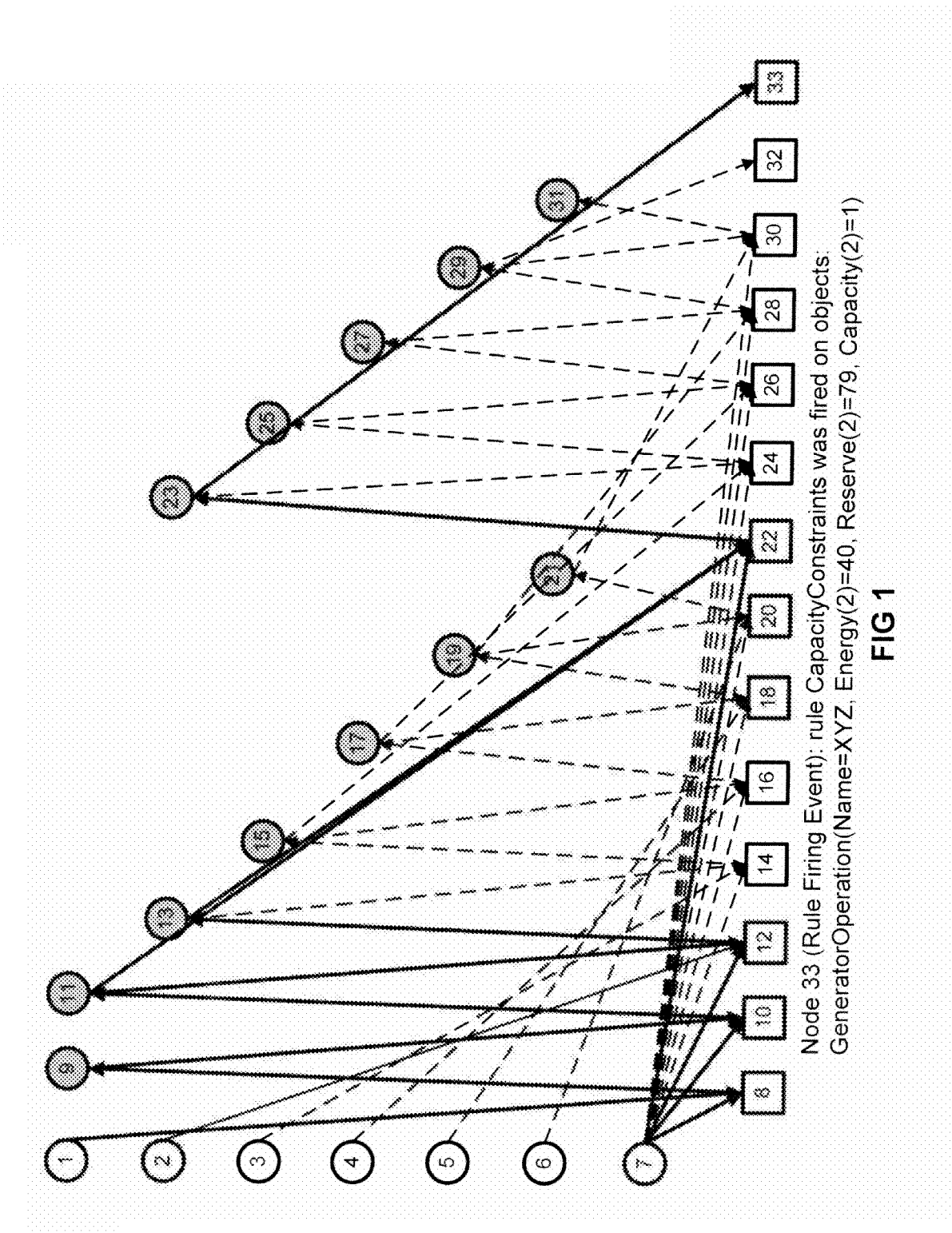
FIG. 1 is a screen-shot of a causality network graph created in accordance to the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is a method of collecting inference execution events from forward-chaining business rule engines. Thereafter, a causality network graph is constructed and presented visually to an end user. Using the network graph, the user may navigate logic paths leading to particular conclusions or actions. The present invention allows a user to perform an inference back-trace (also referred to as a logic back-trace), which refers to the capability to back-track through the reasoning paths that lead to given conclusion or action. By tracing and displaying the reasoning in an easily understood manner, a user may inspect the inference logic for debugging, auditing and validation purposes.

The present invention uses the rule engine application programming interface (API) to capture modification of facts in the working memory and rule engine execution events. Event messages of each rule execution are captured, as well as any modification of the facts, using the same API. This may be done automatically during rule executions so that when the executions are over, the data is acquired and ready to be analyzed. The captured data is analyzed to determine the logical dependence between the rule execution instances and the states of the objects. The resulting causality network graph can be presented visually and provides interactive capability to the user.

For purposes of the present disclosure, the following terms are defined as follows. A "rule" is an IF-THEN statement defined by an end user, which represents the inference logic to be applied by the rule engine. A rule may reference one or more objects in the IF or THEN clauses. An "object" is the software representation of a real world object, such as a customer. An object consists of on or more "attributes" (i.e. qualities or features, such as, for example, a name) and/or related behavior (e.g., get the name of this customer). A "fact" is an instantiated object that contains specific data about that object at a given time or event. A fact represents a particular state of an object. An "event" represents either a rule firing instance (i.e., rule engine execution instance) or a fact insertion, modification, deletion. An event is represented as a circle node or a square node in the visual graph produced by the graphical user interface (GUI). A "node" is either a rule execution event node (often called rule node, represented as squares) or a fact insertion/modification event node (often called fact node, represented as circles). An object can be modified several times and have different states during rule executions. Thus, the same object can have multiple fact nodes in the visual graph, each one representing a fact insertion or modification event. Likewise, a rule might be fired multiple times during rule executions. As a result, the same rule can have several rule nodes in the visual graph, each one representing a rule firing event. A "conclusion" is an event after the rule engine starts to evaluate rules. It can be any node in the visual graph that is not an initial fact.

The graphical user interface (GUI) of the present invention visually presents rule engine execution instances, initial facts, intermediate conclusions, and the final conclusions. A user may select a conclusion from a list of conclusions or directly from the visual display. Once selected, the back-tracing display shows all the rules and facts that contributed to a selected conclusion. A user may navigate the back trace paths graphically, and select each rule execution instance or intermediate fact for more detailed information.

With reference now to FIG. 1, an illustrative causality network graph is shown. As discussed above, each node represents an event. The circle shaped nodes represent fact events. As discussed above a fact is an instantiated object, thus a fact may represent the instantiated initial object or an updated object. An example of a fact event may be changing the status of a breaker from open to closed, or changing the membership level of a customer from standard to VIP. Rectangle shaped nodes represent rule execution events. Fact nodes 1-7 represent the insertion of a fact into working memory (i.e. initial facts). Fact nodes 9, 11, 13, 15, 17, 19, 21, 23, 25, 27, 29 and 31 represent the updating of an existing fact in the working memory. As can be seen, each node includes a unique number, which represents the time sequence of rule execution events. For example, node 2 represents an event in which a fact is inserted. This event occurs after node 1, which also represents a fact insertion event.

The arrows or links from the circle shaped nodes to the rectangle shaped nodes indicate that the objects represented in the circle nodes are involved in the activation of the rule. For example, in FIG. 1, arrows extend from nodes 1 and 7 to node 8 indicating that the two objects represented by nodes 1 and 7 are used to evaluate the rule that is processed in node 8. The arrows from the rectangular shaped nodes to the circle shaped nodes represent one or more objects that are modified in the rule represented in the rectangle nodes, thereby creating new facts. For example, the arrow from rectangular shaped node 8 to circle shaped node 9 represents an object that is updated in the rule executing event 8.

As shown in FIG. 1, in one embodiment the initial fact states are indicated in a vertically extending column at a left hand side of the display. These represent the facts prior to execution of any rules. Different states of the same object are shown in the same horizontally extending row. Thus, for example, circle shaped nodes 1, 9 and 11 are in the same horizontally extending row and are therefore three different states of the same object.

Detailed information about each node is available by moving a mouse pointer over that node, or otherwise highlighting or selecting a particular node. For example, node 33 is rectangular and thus represents a rule execution event. When selected, as shown in FIG. 1, a text box is displayed below indicating that the rule name is CapacityConstraints, one object is involved named GeneratorOperation object, and its attributes are shown as name=XYZ, energy(2)=40, Reserve (2)=79, etc. Further, the darkened arrows indicate all nodes that contributed to the rule execution event of node 33. In this manner, a user may quickly review the rule being executed as well as the factors preceding the execution of the rule.

Figure 2:
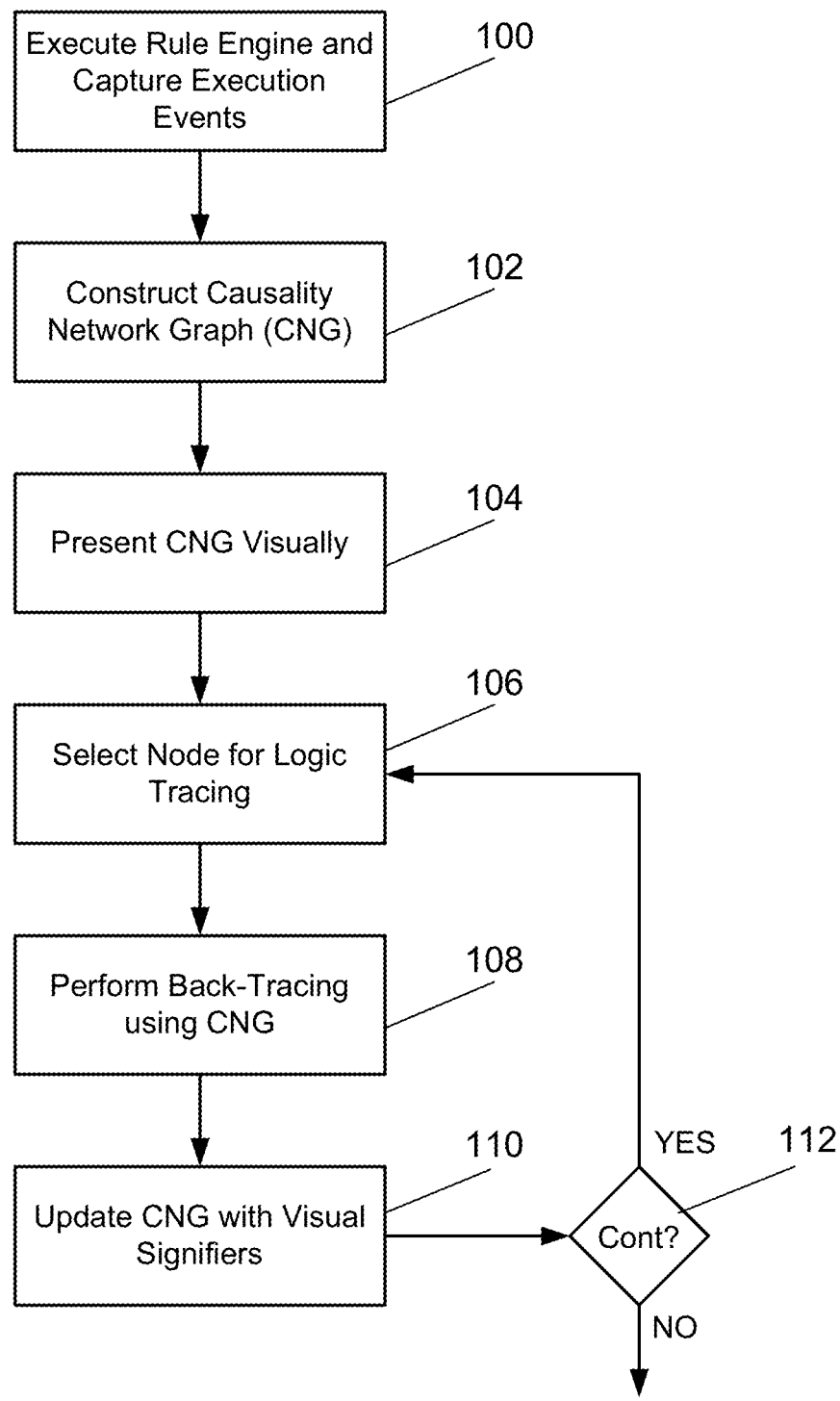
FIG. 2 is a process flow chart showing the process overview.

With reference now to FIG. 2, a flowchart is provided describing the method of the present invention. At a first step 100, the rule engine is executed and all execution events are captured. At step 102, a causality network graph is constructed from the captured execution events. At step 104 the causality network graph is presented visually to a user. At step 106 a node is selected by the user for logic tracing. As discussed above, the selection may be made by, for example, moving a mouse cursor over a node. At step 108, back-tracing is performed in a manner to be described below. At step 110 the causality network graph is updated with visual signifiers that indicate the relationship between a selected node and the contributing nodes. Any approach may be used to provide visual signifiers to a user. For example, as shown in FIG. 1, the back-tracing links are darkened in comparison to the remaining links. In other embodiments, different colors may be use, different line weight or blinking lines may be used. At step 112 a user may select a new fact to back-trace, or may end the use of the causality network graph.

Figure 3:
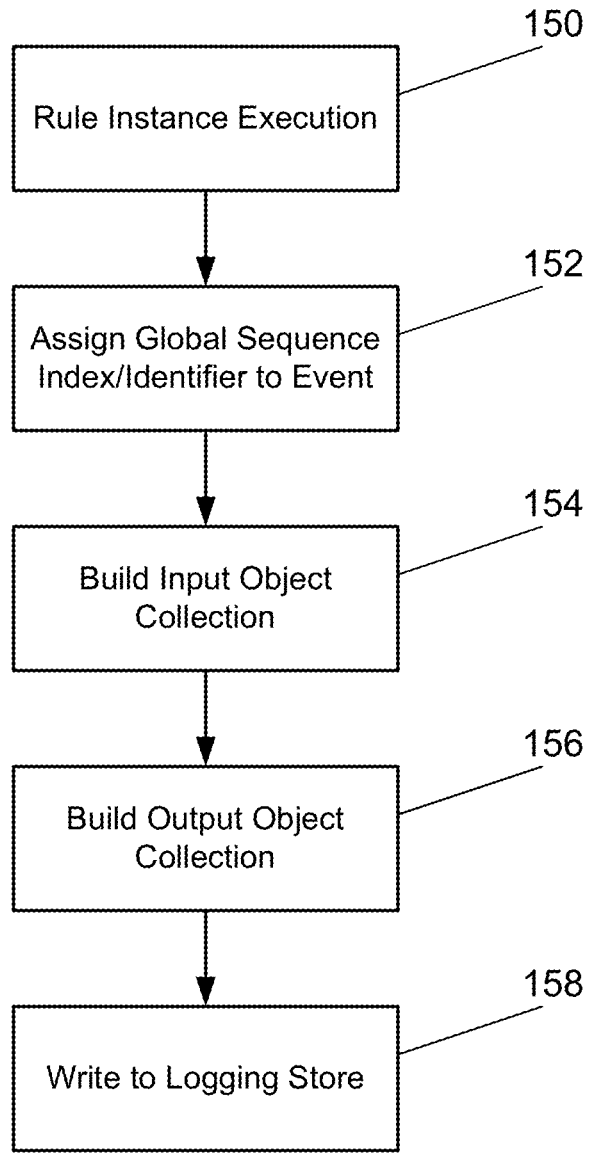
FIG. 3 is a process flow chart showing the capture of a rule execution instance.

With reference now to FIG. 3, it is shown how rule execution events are captured. In a first step 150, a rule instance execution is acquired. At step 152, a global sequence index is assigned to the event. The global sequence index is a globally unique number assigned to each event and serves two purposes. First, an event may be looked up and identified by index number, and second, the index number establishes a temporal order among the events. At step 154, an input object collection is built for that rule execution instance. The input object collection includes all objects reference in the "IF" clause of a rule execution instance. At step 156 an output object collection is build for that rule instance execution. The output object collection includes all objects referenced in the "THEN" clause of the rule instance execution. The input and output object collections for that rule execution instance are then written to a logging store at step 158. Each rule execution instance is processed in this manner until the rule engine completes its run.

Figure 4:
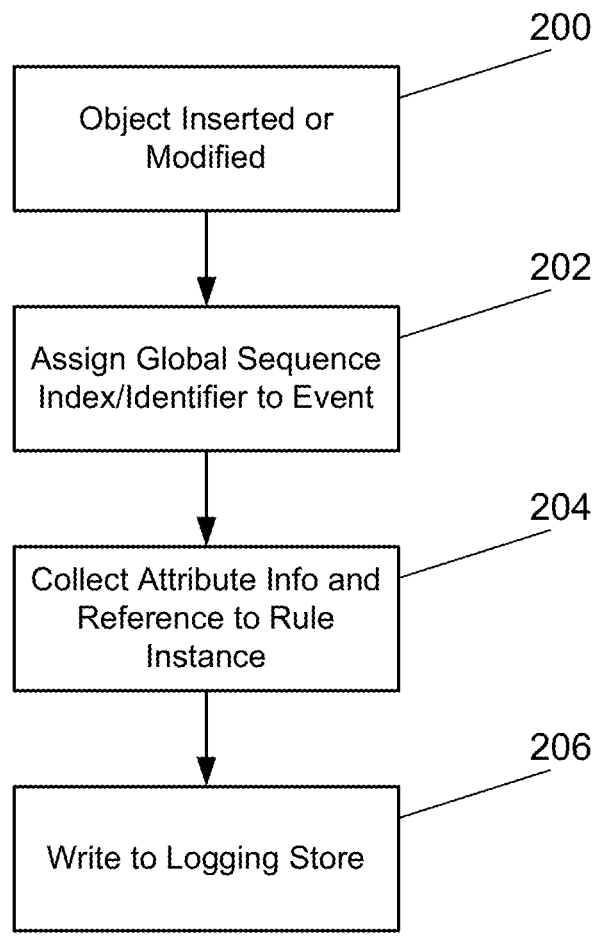
FIG. 4 is a process flow chart showing the capture of a fact modification instance.

The other major event when running a business rule engine is the modification of an object. With reference now to FIG. 4, it is shown how the object change events are captured. In a first step 200, a object change event is acquired. At step 202, a global sequence index number is assigned to the event. At step 204, attribute information is collected along with the reference to the rule instance that leads to the object change events. The attribute information and rule instance reference for that object change event are then written to a logging store at step 206. Each object change event is processed in this manner until the rule engine completes its run.

Figure 5:
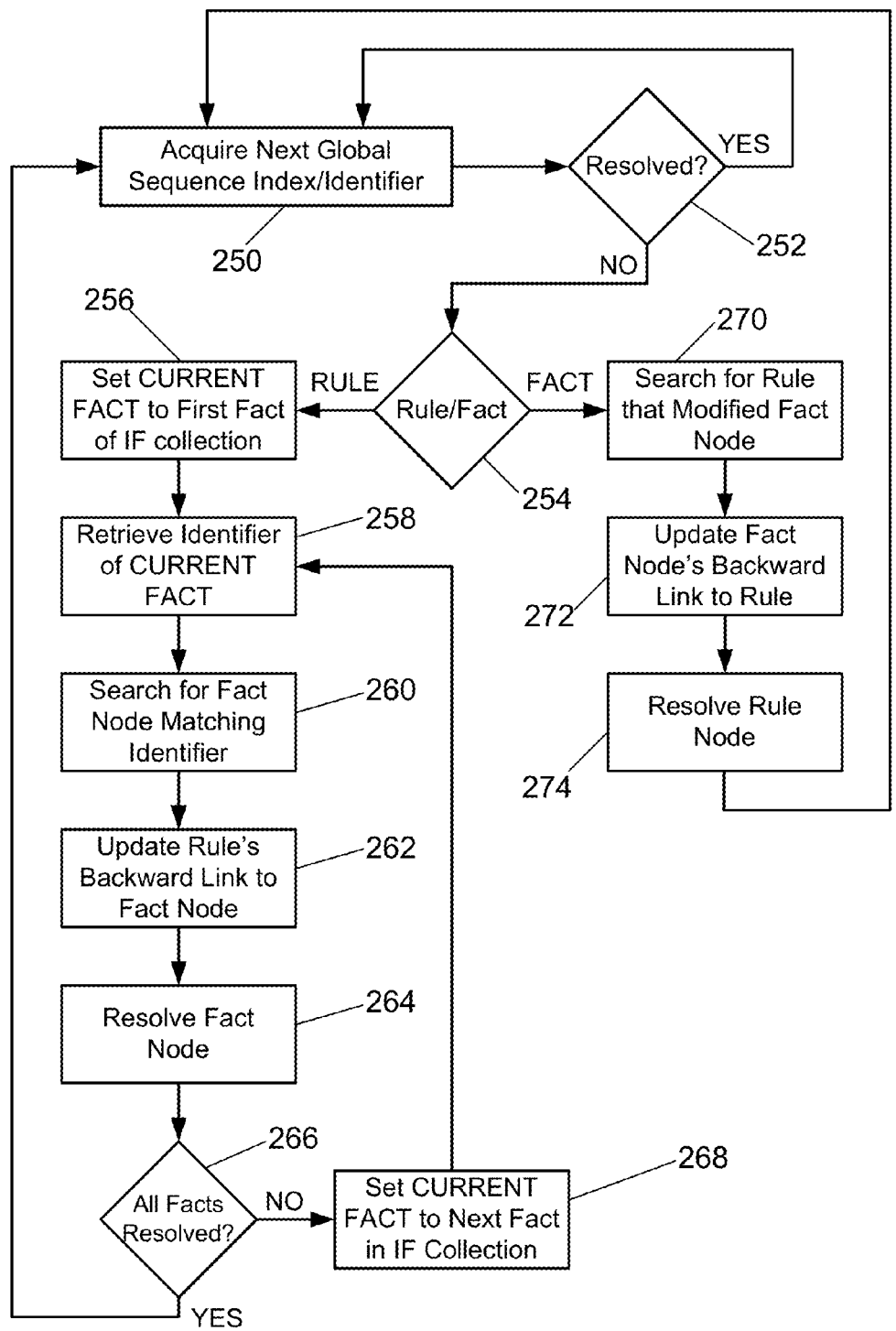
FIG. 5 is a process flow chart showing the resolution of a rule or fact node.

When the business rule engine completes its run and all the object change and rule execution events are acquired, the causality network graph may be generated. To generate the graph, event relationships must first be determined. With reference now to FIG. 5, it is shown how the nodal relative relationships are determined. At step 250, a global sequence index and identifier is selected (typically beginning at index value 1) and it is determined at step 252 whether the corresponding node/event has already been resolved. For purposes of the present disclosure, resolved or resolution references the identification of the logical dependence of a node. Thus, resolution of a rule firing event node, means that all the fact nodes referenced in the IF and THEN clauses have been identified. For nodes corresponding to initial objects, resolution is trivial, as they do not depend on any other objects or rule executions. Intermediate and final nodes are resolved by capturing the rule execution events, and correlating them with known nodes. The dependence of a node "x" on another node "y" may be represented by an ordered pair (x,y) and are shown graphically by an arrow or link directed from "x" to "y".

If at 252 it is determined that the node has not yet been resolved, at 254 it is determined whether the node is a rule execution node or a fact node. If the node is a rule execution node, at 256 a variable CURRENT FACT is set to the first fact from the IF collection correlating to that node.

At step 258 the global sequence index number of the CURRENT FACT is retrieved. At step 260 the fact node matching the global sequence index is located. At step 262, the rule node's backward link is updated to include the fact node identified in step 260. At step 264 the fact node identified at step 260 is resolved. Because the process ordinarily begins at the first global sequence index value and proceeds chronologically, this test should always pass (i.e. the fact node should already be resolved) and is primarily an error checking mechanism. At 266 it is determined whether all fact nodes from the IF collection of the current rule execution node have been resolved. If not, at 268 the CURRENT FACT is set to the next fact in the IF collection and the loop returns to step 258. If all facts in the IF collection are resolved, the rule node is resolved, and the process moves to the next node in the global sequence index.

If, at step 254 it is determined that the node is a fact node, at 270 a search is performed for the rule execution node that modified the fact node. This search is straightforward because the information is already collected during the event collection stage as shown at step 204 in FIG. 4. If a rule modified the fact node, at 272 the fact node's backward link to the rule execution node is updated. At step 274 the rule node identified at step 270 is resolved. As discussed above, because the process ordinarily begins at the first global sequence index value and proceeds chronologically, this test should always pass (i.e. the rule node should already be resolved) and is primarily an error checking mechanism. Thereafter, the process continues to the next node in the global sequence index. The process continues until all nodes in the global sequence index are resolved. In this manner, the causal relationship between all fact and rule nodes is determined and a causality network graph may be created. These relationships may then be visually displayed to a user as arrows or links between the various nodes. Thereafter, a user may select any node on the causality network graph, and the back-tracing will be highlighted for a user to review.

Figure 6:
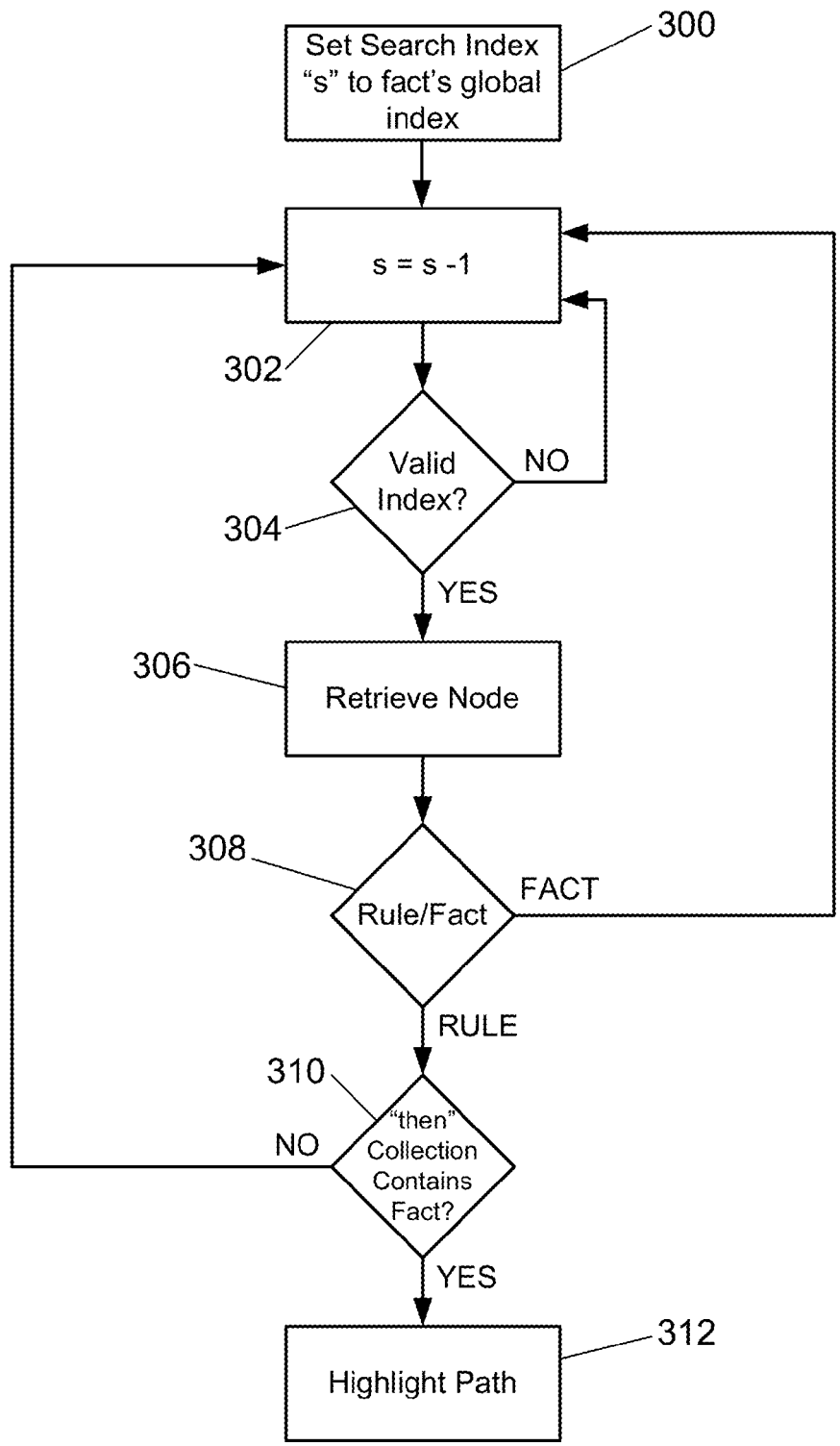
FIG. 6 is a process flow chart showing the process for finding a rule that modified a given fact node.
Figure 7:
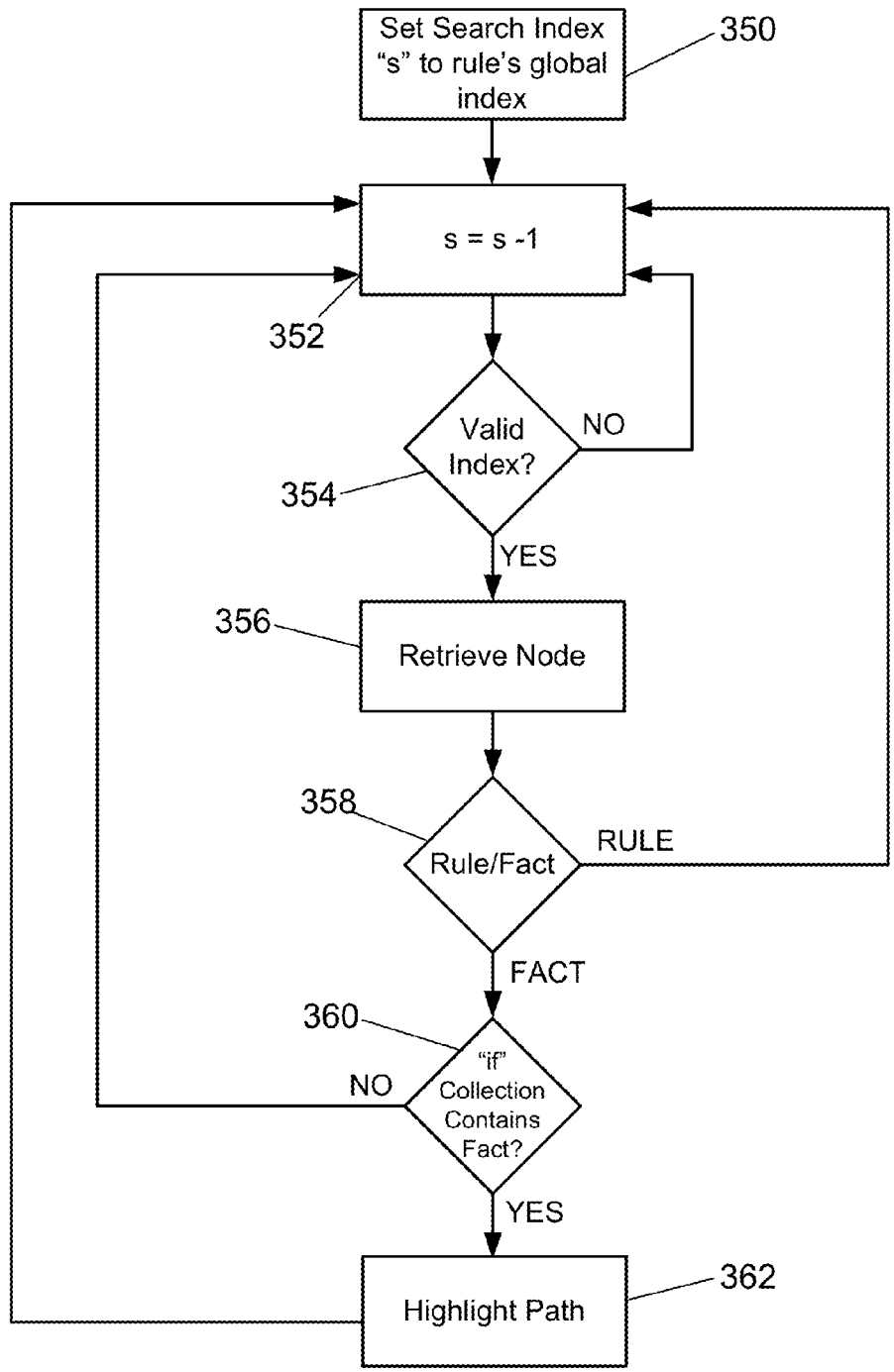
FIG. 7 is a process flow chart showing the process for finding a fact node that is a condition of a rule node.

When an end user selects a node in the visual graph as shown in step 106 in FIG. 2, the algorithms described in FIG. 6 and FIG. 7 iteratively determine the event history of the selected node and highlights that history. If the selected node is fact node, the algorithm of FIG. 6 is used to find the event history. If the selected node is a rule execution node, the algorithm of FIG. 7 is used to find the event history.

With reference now to FIG. 6, the process is shown for determining whether a rule execution node modified a given fact. At a step 300, search index "s" is set to the fact node's global index value. Next, the search index is reduced by one at 302. At 304 it is determined whether the search index "s" is valid. If the search index "s" is not valid (i.e. no node exists having that index value), the process returns to step 302. If the search index "s" is valid, the node is retrieved at 306. At 308 it is determined whether the node is a fact node or a rule node. If a fact node is recognized, the process returns to step 302. If a rule node is recognized, the process proceeds to step 310 wherein it is determined whether the "then" collection of the rule node includes the fact. If the "then" collection does not contain the fact, the process returns to step 302. If the "then" collection does contain the fact, the rule execution node is found and the path from this node to the fact node is highlighted visually to the user at 312. The search is then continued from this newly found rule firing node using the process shown in FIG. 7. This process continues until global sequence index reaches the first index value.

With reference now to FIG. 7, the process is shown for determining whether a fact is used for a given rule execution node. At a step 350, search index "s" is set to the rule node's global index value. Next, the search index is reduced by one at 352. At 354 it is determined whether the search index "s" is valid. If the search index "s" is not valid (i.e. no node exists having that index value), the process returns to step 352. If the search index "s" is valid, the node is retrieved at 356. At 358 it is determined whether the node is a fact node or a rule node. If a rule node is recognized, the process returns to step 352. If a fact node is recognized, the process proceeds to step 360 wherein it is determined whether the "if" collection of the rule node includes the fact. If the "if" collection does not contain the fact, the process returns to step 352. If the "if" collection does contain the fact, the fact is part of the condition that triggers this rule to be executed. Thus, the path from the fact node to the rule firing event node is highlighted visually to the user at 362. The process then returns to step 352 to locate any other fact nodes in the "if" collection. After all fact nodes involved in the rule firing event are located, the search is then continued from the newly found fact node(s) using the process shown in FIG. 6. This process continues until global sequence index reaches the first index.

As a first example, a scenario is provided having only two rules. In this example, a retail store provides customers different discount rates based on the membership level, purchase history, status (e.g., students, seniors, and veterans), etc. The following rules are defined for Store ABC to offer discount rate for customers:

Rule 1: If a silver level customer has a year-to-date total purchase equal to or greater than $5000, promote the customer to gold level.

Rule 2: For gold level customers with a current purchase equal to or greater than $2000, apply 25% discount to the current purchase.

The following attributes (YTD purchase total, membership level) are provided for John (an object). The collection of attributes associated with John is a fact:

John (YTD purchase total=3200, membership level=silver)

The following attributes are provided for a transaction (an object):

Transaction (Amount=2100, discount rate=0)

The information above is provided to a business rule engine which executes. The events are captured as shown below:

Event 1: insert object John (YTD purchase total=3200, membership level=silver). As shown in FIG. 4, a global event sequence of index 1 is assigned to the event and attributes of YTD purchase total and membership are collected.

Event 2: insert object Transaction (Amount=2100, discount rate=0). As shown in FIG. 4, a global event sequence index 2 is assigned to this event, and attributes of amount and discount rate are collected.

Event 3: execute rule 1. As shown in FIG. 3, for a rule execution occurrence, a global sequence index of 3 is assigned to this event. An input object collection ("if" collection) is built including John (YTD purchase total=3200, membership level=silver). An output object collection ("then" collection) is built including John (YTD purchase total=5300, membership level=gold).

Event 4: modify object John (YTD purchase total=5300, membership level=gold). As shown in FIG. 4, a global event sequence index 4 is assigned to this event, attributes of YTD purchase total and membership are collected and reference to the rule instance 1 and node 3 are collected.

Event 5: execute rule 2. As shown in FIG. 3, for a rule execution occurrence, a global sequence index of 5 is assigned to this event. An input object collection ("if" collection) is built including John (YTD purchase total=5300, membership level=gold) and Transaction (Amount=2100, discount rate=0). An output object collection ("then" collection) is built including Transaction (Amount=2100, discount rate=25%).

Event 6: modify object Transaction (Amount=2100, discount Rate=25%). As shown in FIG. 4, a global event sequence index of 6 is assigned to this event, attributes of Amount and Discount Rate are collected and reference to rule instance 2 and node 5 are collected.

Figure 8:
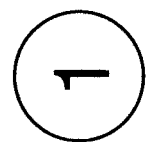
FIG. 8 is a first interim view of a first exemplary causality network graph created in accordance with the present invention.
Figure 9:
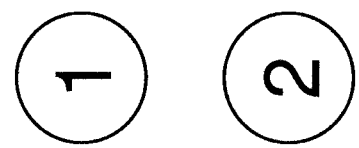
FIG. 9 is a second interim view of a first exemplary causality network graph created in accordance with the present invention.
Figure 10:
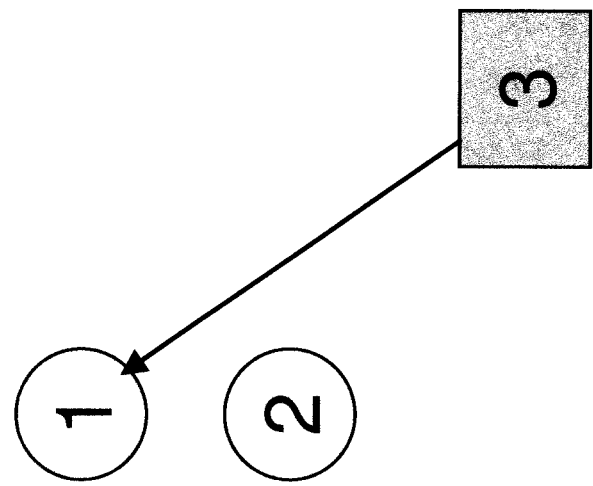
FIG. 10 is a third interim view of a first exemplary causality network graph created in accordance with the present invention.

Once the business rule engine completes its run and the relevant data is collected in the manner described above, a causality network graph may be created according to process shown in FIG. 5. Each event is shown as a node in the graph. As shown in FIG. 8, the first event is shown as node one and because it is an inserted object, it is already resolved. Likewise, in FIG. 9, the second event is shown as node two and because it is an inserted object, it is already resolved. Turning to FIG. 10, the third event is shown as node three. According to the logic tracing process shown in FIG. 5, it is determined that the node is not resolved, the node is a rule node and therefore the CURRENT FACT is set to John (YTD purchase total=3200, membership level=silver). The identifier of the CURRENT FACT is retrieved (node one) and the fact node matching the identifier is found. Next, the rule node's backward link is updated to link to the fact node (node one). This is shown visually as an arrow directed from node three to node one. Next, the fact node is resolved (already resolved as discussed above). Finally, a check is performed to determine whether all fact nodes are resolved for this rule node (all fact nodes are resolved). As can be seen, the causality network graph now has three nodes and one link.

Figure 11:
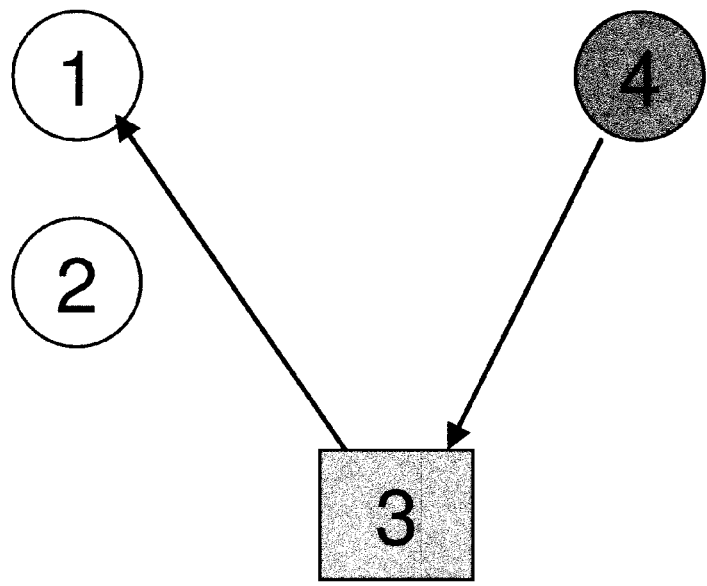
FIG. 11 is a fourth interim view of a first exemplary causality network graph created in accordance with the present invention.

As shown in FIG. 11, the fourth event is shown as node four in the graph. According to the process shown in FIG. 5, because the node is a fact node, a search is performed for the rule node that modified the fact node. Rule one, node three modified the fact node. The backward link to node 3 is updated and is shown visually as an arrow directed from node four to node three. Next the rule node is resolved (already resolved). As can be seen, the causality network graph now has four nodes and two links.

Figure 12:
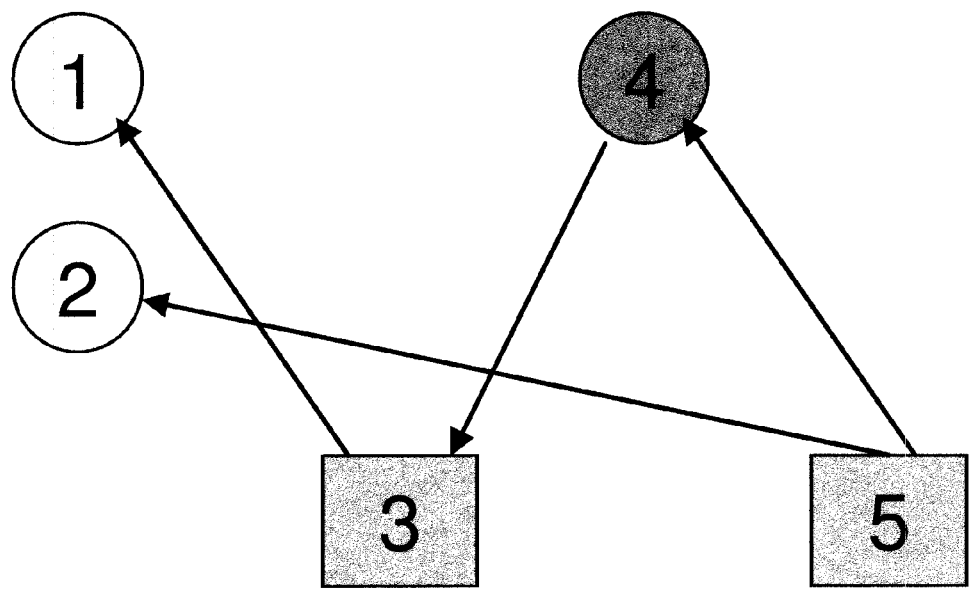
FIG. 12 is a fifth interim view of a first exemplary causality network graph created in accordance with the present invention.

Referring now to FIG. 12, the fifth event is shown as node five in the causality network graph. Because the node is a rule execution node, According to the logic tracing process shown in FIG. 5, it is determined that the node is not resolved, the node is a rule node and therefore the CURRENT FACT is set to John (YTD purchase total=5300, membership level=gold). The identifier of the CURRENT FACT is retrieved (node four) and the fact node matching the identifier is found. Next, the rule node's backward link is updated to link to the fact node (node four). This is shown visually as an arrow directed from node five to node four. Next, the fact node is resolved (already resolved as discussed above). Finally, a check is performed to determine whether all fact nodes are resolved for this rule node. In this case, a second fact is stored in the "if" collection. The CURRENT FACT is thus set to Transaction (Amount=2100, discount rate=0). The identifier of the current fact is retrieved (node two) and the fact node matching the identifier is found. Next the rule node's backward link is updated to link to the fact node (node two). This is shown visually as an arrow directed from node five to node two. Next the fact node is resolved (already resolved as discussed above). Finally, a check is again performed to determine whether all fact nodes in the "if" collection are resolved for this rule (all fact nodes are resolved). The causality network graph now has five nodes and four links.

Figure 13:
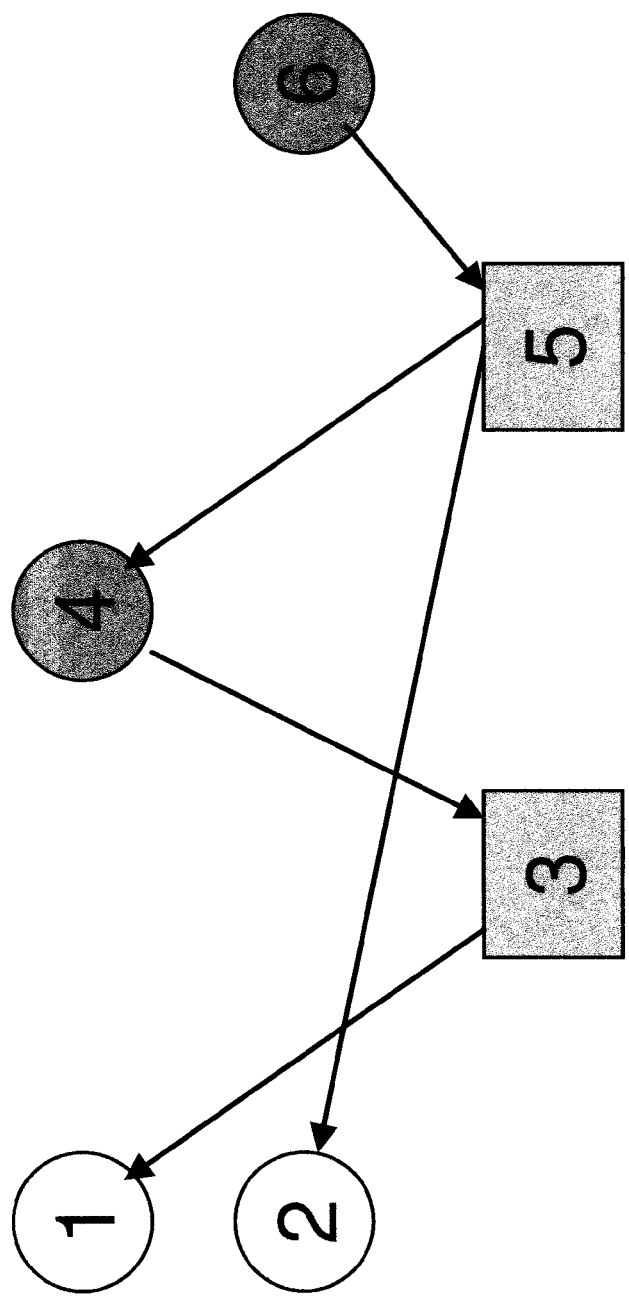
FIG. 13 is a sixth interim view of a first exemplary causality network graph created in accordance with the present invention.

As shown in FIG. 13, the sixth event is shown as node six in the graph. According to the process shown in FIG. 5, because the node is a fact node, a search is performed for the rule node that modified the fact node. Rule two, node five modified the fact node. The backward link to node five is updated and is shown visually as an arrow directed from node six to node five. Next the rule node is resolved (already resolved). As can be seen, the causality network graph now has six nodes and five links.

In this manner, the causality network graph is formed. If a user selects a node in the graph, all the links that lead to this event are visually highlighted according to the links formed in the process discussed above.

The above example has relatively few events, and is shown primarily to provide a simplified example. The benefits of the present invention are most apparent when a rule engine includes many more objects, and many more rules. In such instances it virtually impossible for a user back-trace manually. FIGS. 14-16 show exemplary rules and data sets that a power system business rule engine might use. In particular, the rules/data are for a generator capacity constraint validation problem in a business management system. Each generator must run within its capacity at any given time. The capacity of a generator at a given timestamp is a function of several parameters, such as the base capacity, base ramp rate, maximum capacity, maximum ramp rate, capacity at a previous timestamp, and current ramp rate.

After the rule engine runs and the causality network graph is generated, the resulting visual display shown in FIG. 1 is provided to a user. If a user wishes to know more about node 33, the user may point and click node 33. As is shown in FIG. 1, the paths that lead to node 33 are highlighted and the current value of objects in node 33 are shown in a text box. This interface enables quick and easy validation and error analysis.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described and defined in the corresponding appended claims. The computer-readable medium may be any medium that can contain, store, communicate, propagate, or transport the computer-readable instructions for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A computer implemented method of analyzing the conclusions of a business rule engine wherein execution of said business rule engine includes rule execution events and object modification events, the method comprising:
    a computer capturing said rule execution events and said object modification events;
    assigning a unique global sequence identifier to each said rule execution event and object modification event;
    building an if collection and a then collection for each said captured rule execution event;
    collecting attribute information for each said captured object modification event;
    a computer creating a rule backward link from each said captured rule execution event to each object modification event in said if collection of said rule execution event;
    a computer creating an object backward link from each said captured object modification event to the rule execution event that created the object modification event; and
    a computer visually displaying said captured rule execution events, said captured object modification events, said rule backward links and said object backward links.

2. The method of claim 1 wherein said step of visually displaying said rule execution events, said object modification events, said rule backward links and said object backward links comprises visually displaying on a computer display fact nodes correlating to each said captured object modification event and rule nodes correlating to each said captured rule execution event.

3. The method of claim 2 wherein said rule nodes are represented on the computer display by a first shape and said fact nodes are represented on the computer display by a second shape, said first shape being different from said second shape.

4. The method of claim 2 wherein said rule backward links and said object backward links comprise arrow shaped lines displayed on the computer display.

5. The method of claim 2 wherein each said rule nodes extend in a line on a first axis and said fact nodes representative of an object initialization extend in a line on a second axis disposed ninety degrees from said first axis.

6. The method of claim 2 further comprising the step of highlighting all rule backward links, object backward links, rule nodes and fact nodes that trace to a node selected by a user.

7. The method of claim 6 wherein the node selected by the user is selected by the user positioning a cursor over a node on the computer display.

8. The method of claim 1 wherein said if collection comprises all captured object modification events that trigger or are used in a captured rule execution event and said then collection comprises all captured object modification events created by said captured rule execution event.

9. The method of claim 1 comprising the computer providing a graphical user interface.

10. The method of claim 1 wherein said business rule engine comprises a forward-chaining rule engine, and the computer captures said rule execution events and said object modification events during execution of said forward-chaining rule engine.

11. A non-transitory computer readable medium containing computer executable instructions which, when executed by a computer, perform a method of analyzing the conclusions of a business rule engine wherein execution of said business rule engine includes rule execution events and object modification events, the method comprising:
- capturing said rule execution events and said object modification events;
- assigning a unique global sequence identifier to each said rule execution event and object modification event;
- building an if collection and a then collection for each said captured rule execution event;
- collecting attribute information for each said captured object modification event;
- creating a rule backward link from each said captured rule execution event to each object modification event in said if collection of said rule execution event;
- creating an object backward link from each said captured object modification event to the rule execution event that created the object modification event; and
- visually displaying said captured rule execution events, said captured object modification events, said rule backward links and said object backward links.

12. The computer readable medium of claim 11 wherein said step of visually displaying said rule execution events, said object modification events, said rule backward links and said object backward links comprises visually displaying fact nodes correlating to each said captured object modification event and rule nodes correlating to each said captured rule execution event.

13. The computer readable medium of claim 12 wherein said rule nodes are a first shape and said fact nodes are a second shape, said first shape being different from said second shape.

14. The computer readable medium of claim 12 wherein said rule backward links and said object backward links comprise arrow shaped lines.

15. The computer readable medium of claim 12 wherein each said rule nodes extend in a line on a first axis and said fact nodes representative of an object initialization extend in a line on a second axis disposed ninety degrees from said first axis.

16. The computer readable medium of claim 12 further comprising the step of highlighting all rule backward links, object backward links, rule nodes and fact nodes that trace to a node selected by a user.

17. The computer readable medium of claim 16 wherein the node selected by the user is selected by the user positioning a cursor over a node on a computer display.

18. The computer readable medium of claim 11 wherein said if collection comprises all captured object modification events that trigger or are used in a captured rule execution event and said then collection comprises all captured object modification events created by said captured rule execution event.

19. The computer readable medium of claim 11 comprising providing a graphical user interface.

20. The computer readable medium of claim 11 wherein said business rule engine comprises a forward-chaining rule engine, and said rule execution events and said object modification events are captured during execution of said forward-chaining rule engine.

* * * * *